US011467088B2

(12) United States Patent
Kim et al.

(10) Patent No.: US 11,467,088 B2
(45) Date of Patent: Oct. 11, 2022

(54) DETECTOR

(71) Applicant: SEOUL VIOSYS CO., LTD., Gyeonggi-do (KR)

(72) Inventors: Jong Man Kim, Gyeonggi-do (KR); Ki Yon Park, Gyeonggi-do (KR)

(73) Assignee: SEOUL VIOSYS CO., LTD., Ansan-si (KR)

( * ) Notice: Subject to any disclaimer, the term of this patent is extended or adjusted under 35 U.S.C. 154(b) by 65 days.

(21) Appl. No.: 16/805,432

(22) Filed: Feb. 28, 2020

(65) Prior Publication Data
US 2020/0232921 A1  Jul. 23, 2020

Related U.S. Application Data

(63) Continuation of application No. PCT/KR2018/010066, filed on Aug. 30, 2018.

(30) Foreign Application Priority Data

Aug. 31, 2017 (KR) .................. 10-2017-0110553

(51) Int. Cl.
 *G01N 21/64* (2006.01)
 *G01N 21/88* (2006.01)
 *G01N 21/94* (2006.01)
(52) U.S. Cl.
 CPC ..... *G01N 21/6445* (2013.01); *G01N 21/8806* (2013.01); *G01N 21/94* (2013.01); *G01N 2021/8848* (2013.01)
(58) Field of Classification Search
 CPC ........... G01N 21/6445; G01N 21/8806; G01N 21/94; G01N 2021/8848
 See application file for complete search history.

(56) References Cited

U.S. PATENT DOCUMENTS

| 4,880,980 | A | * | 11/1989 | Muller | ............... G08B 13/193 340/567 |
| 5,091,649 | A | * | 2/1992 | Rantala | ............. G01N 21/3504 250/343 |
| 5,255,073 | A | * | 10/1993 | Wallin | ............... G01N 21/3504 250/573 |

(Continued)

FOREIGN PATENT DOCUMENTS

| JP | 2007256208 | 10/2007 |
| JP | 2011523065 | 8/2011 |

(Continued)

OTHER PUBLICATIONS

International Search Report for International Application PCT/KR2018/010066, dated Dec. 10, 2018.

(Continued)

*Primary Examiner* — David P Porta
*Assistant Examiner* — Djura Malevic
(74) *Attorney, Agent, or Firm* — Perkins Coie LLP

(57) ABSTRACT

A detector has an internal sensing space, and includes a light source unit for emitting light into the sensing space, a reflector for reflecting the light, a sample supply for providing a sample into a path of the light, a first sensor unit for sensing the light reflected by the reflector, and a second sensor unit for sensing at least one of scattered light and fluorescence by the sample. The light source and the first and second sensor units are arranged in the sensing space.

22 Claims, 11 Drawing Sheets

(56) References Cited

U.S. PATENT DOCUMENTS

| | | | | |
|---|---|---|---|---|
| 5,767,976 | A * | 6/1998 | Ankerhold | G01N 21/3504 250/338.5 |
| 6,016,203 | A * | 1/2000 | Martin | G01J 3/42 356/442 |
| 6,350,041 | B1 * | 2/2002 | Tarsa | F21V 29/74 362/345 |
| 6,469,303 | B1 * | 10/2002 | Sun | G01N 21/3504 250/338.3 |
| 6,753,967 | B2 * | 6/2004 | Stuttard | G01N 21/359 356/439 |
| 7,126,687 | B2 * | 10/2006 | Hill | G01N 15/0205 356/336 |
| 7,176,460 | B1 * | 2/2007 | Wong | G01N 21/3504 250/336.1 |
| 7,186,979 | B1 * | 3/2007 | Wong | G01N 21/3504 250/336.1 |
| 7,209,230 | B2 * | 4/2007 | Odhner | G01J 3/04 356/308 |
| 7,335,885 | B2 * | 2/2008 | Wong | G01T 1/00 340/629 |
| 7,423,751 | B2 * | 9/2008 | Hairston | G01J 3/32 356/318 |
| 7,554,663 | B2 * | 6/2009 | Hairston | G01N 21/85 356/417 |
| 7,576,844 | B2 * | 8/2009 | Hairston | G01N 15/1463 356/73 |
| 7,855,367 | B2 * | 12/2010 | Tolton | G01N 21/3518 250/338.5 |
| 7,894,044 | B1 * | 2/2011 | Sullivan | G01S 17/95 356/4.01 |
| 8,365,578 | B2 * | 2/2013 | Bae | B01D 46/0086 73/28.04 |
| 8,628,976 | B2 * | 1/2014 | Bolotin | G01N 15/1463 436/104 |
| 8,772,702 | B2 * | 7/2014 | Bachels | G08B 13/191 340/567 |
| 9,165,443 | B2 * | 10/2015 | Bachels | G08B 13/193 |
| 9,207,175 | B2 * | 12/2015 | Yu | G01N 21/64 |
| 9,280,726 | B2 * | 3/2016 | Dorris | G06K 9/78 |
| 9,297,758 | B2 * | 3/2016 | Frigo | G01N 21/3504 |
| 9,638,622 | B2 * | 5/2017 | Tahara | G01N 21/49 |
| 9,803,877 | B2 * | 10/2017 | Yun | G01N 15/0205 |
| 9,851,291 | B2 * | 12/2017 | Silcott | G01N 15/1434 |
| 10,782,230 | B2 * | 9/2020 | Bjoroy | G01J 3/021 |
| 11,002,674 | B2 * | 5/2021 | Bjoroy | G01N 21/39 |
| 11,181,472 | B2 * | 11/2021 | Stock | A61B 5/082 |
| 2002/0063216 | A1 | 5/2002 | Clausen | G01N 21/3504 250/343 |
| 2002/0118362 | A1 * | 8/2002 | Saccomanno | G01N 21/05 356/246 |
| 2003/0057383 | A1 * | 3/2003 | DiDomenico | G01N 21/3504 250/504 R |
| 2005/0105077 | A1 * | 5/2005 | Padmanabhan | G01N 33/5094 356/39 |
| 2005/0162655 | A1 * | 7/2005 | Nadler | G01N 21/39 356/437 |
| 2006/0124835 | A1 * | 6/2006 | Kiyomoto | H01L 33/54 257/E33.059 |
| 2006/0158615 | A1 * | 7/2006 | Williamson | G03F 7/70225 353/37 |
| 2006/0197033 | A1 * | 9/2006 | Hairston | G01N 21/53 250/458.1 |
| 2006/0232775 | A1 * | 10/2006 | Hairston | G01N 15/1463 356/388 |
| 2006/0232776 | A1 * | 10/2006 | Hairston | G01J 3/0218 356/388 |
| 2006/0237665 | A1 * | 10/2006 | Barney | G01N 21/6408 250/458.1 |
| 2006/0250606 | A1 * | 11/2006 | Kaye | G01N 21/6486 356/417 |
| 2008/0079937 | A1 * | 4/2008 | Goodson, III | G01J 3/02 356/311 |
| 2009/0242799 | A1 * | 10/2009 | Bolotin | G08B 21/12 356/335 |
| 2011/0036995 | A1 * | 2/2011 | Binnie | G01N 21/53 250/461.1 |
| 2011/0120211 | A1 * | 5/2011 | Bae | F24F 3/16 73/28.04 |
| 2012/0033220 | A1 * | 2/2012 | Kotidis | G01J 3/108 356/445 |
| 2012/0043476 | A1 * | 2/2012 | Salmelainen | G01N 21/645 250/200 |
| 2015/0168288 | A1 * | 6/2015 | Binnie | G01N 21/6486 250/461.1 |
| 2018/0172580 | A1 * | 6/2018 | Bjoroy | G01N 21/39 |
| 2018/0313743 | A1 * | 11/2018 | Dixon | G01N 15/147 |
| 2020/0088632 | A1 * | 3/2020 | Bjoroy | G01N 21/255 |

FOREIGN PATENT DOCUMENTS

| | | |
|---|---|---|
| JP | 2015227805 | 12/2015 |
| KR | 200363865 | 10/2004 |
| WO | 2016200274 | 12/2016 |

OTHER PUBLICATIONS

Office Action issued in corresponding Korean Application 1020170110553, dated May 22, 2021.

* cited by examiner

[FIG. 1]
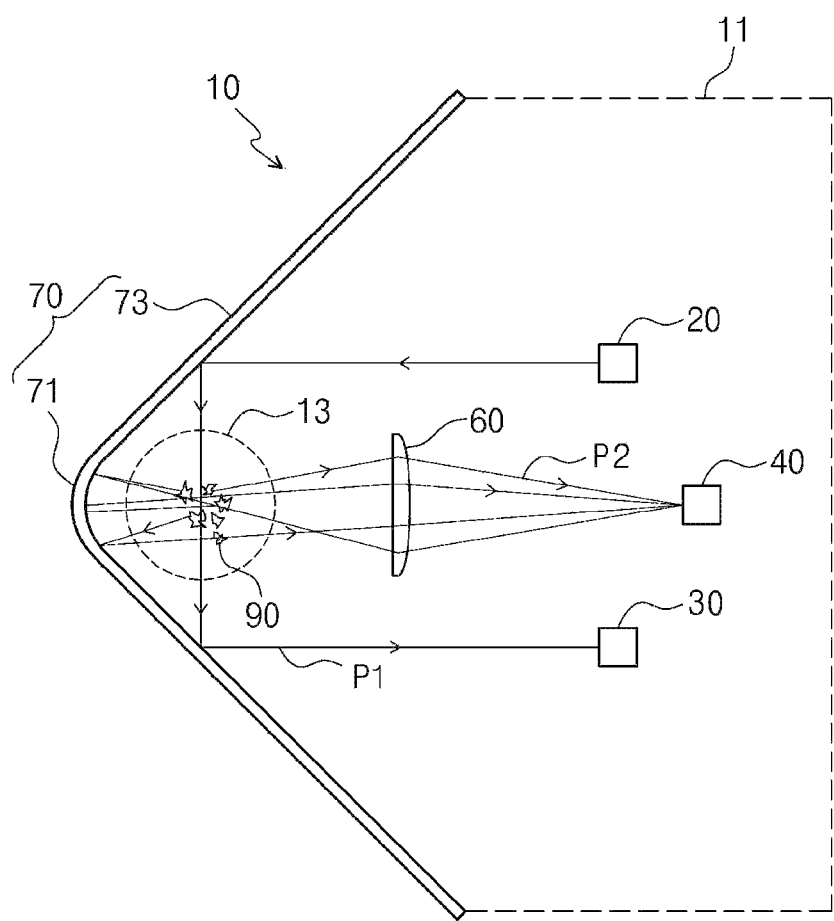

[FIG. 2]
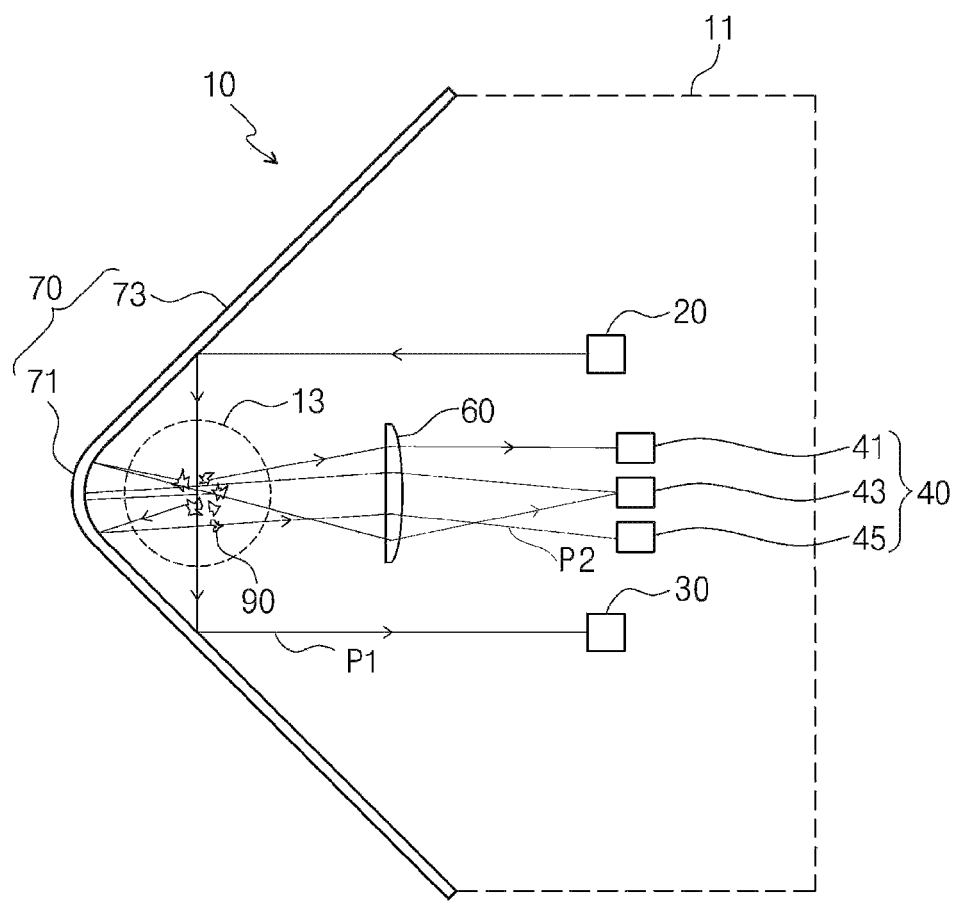

[FIG. 3]
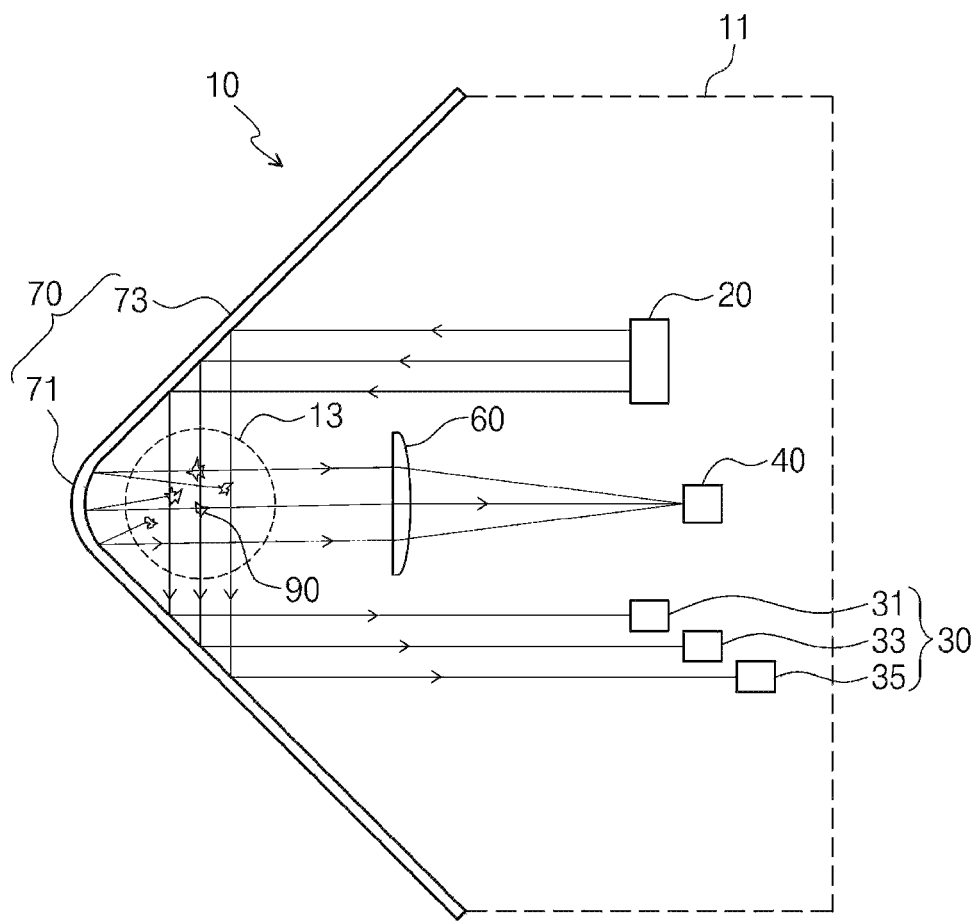

[FIG. 4]
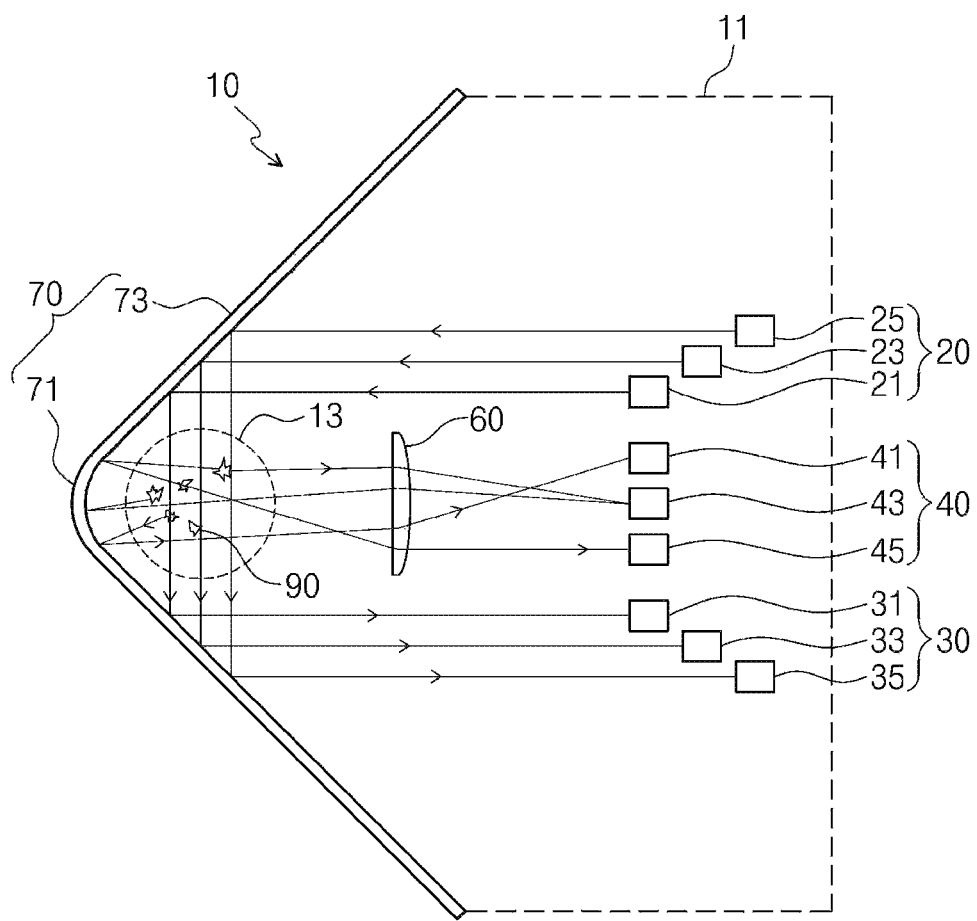

[FIG. 5]
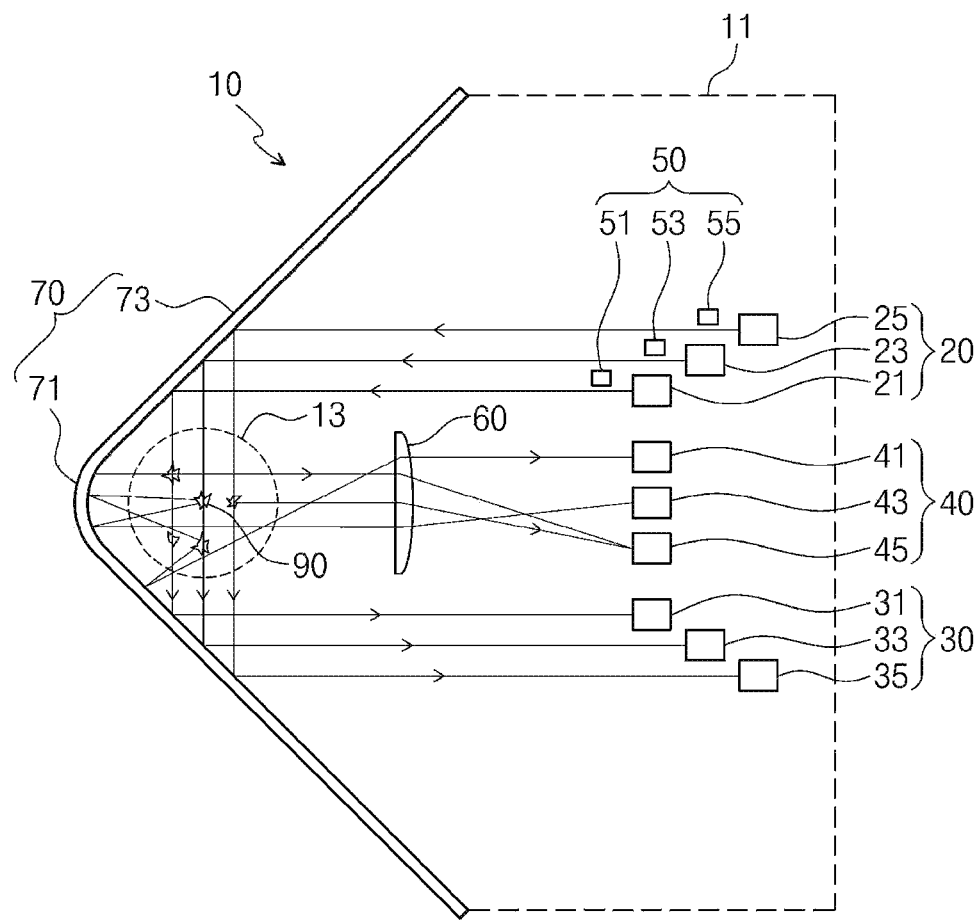

[FIG. 6]
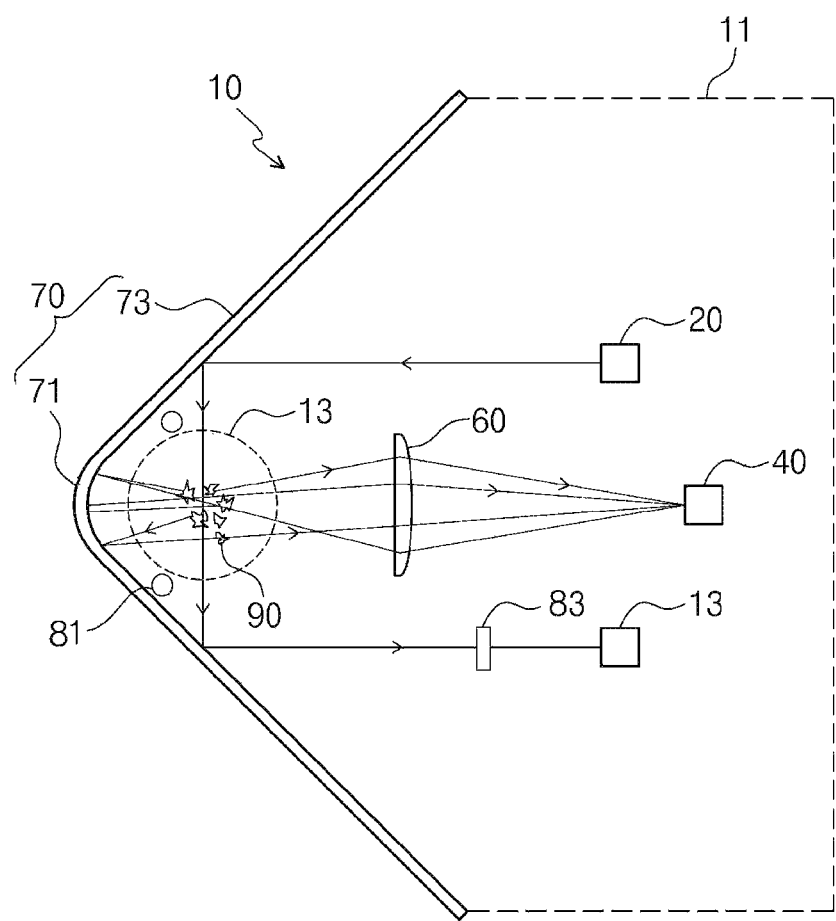

[FIG. 7]
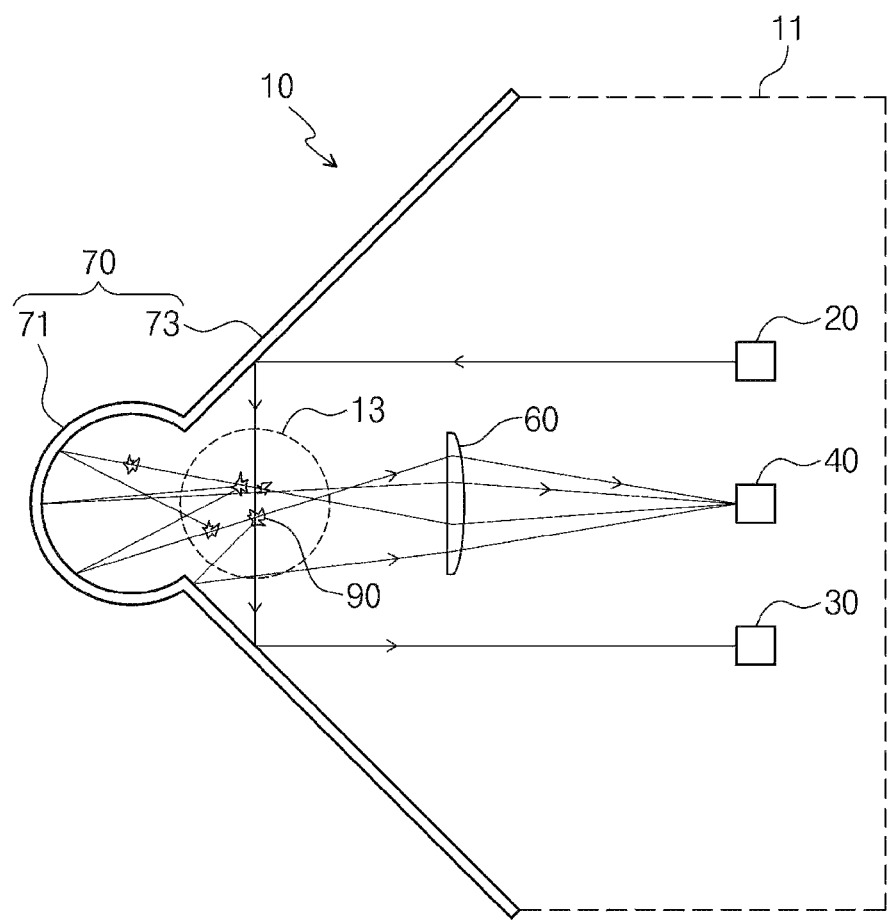

[FIG. 8]
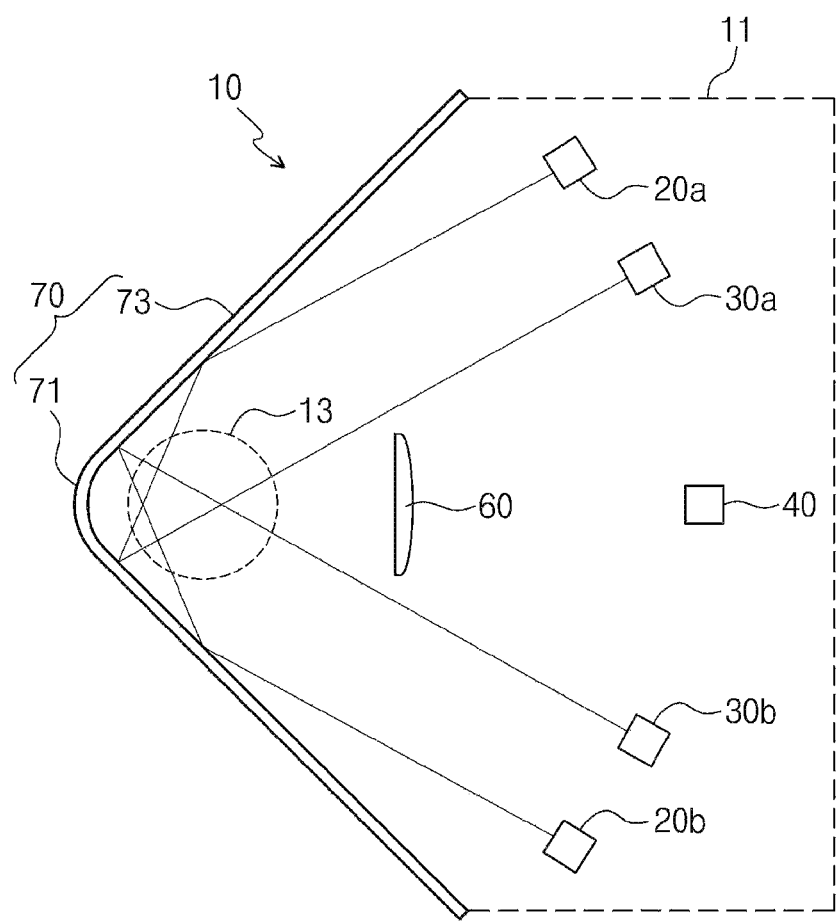

[FIG. 9]
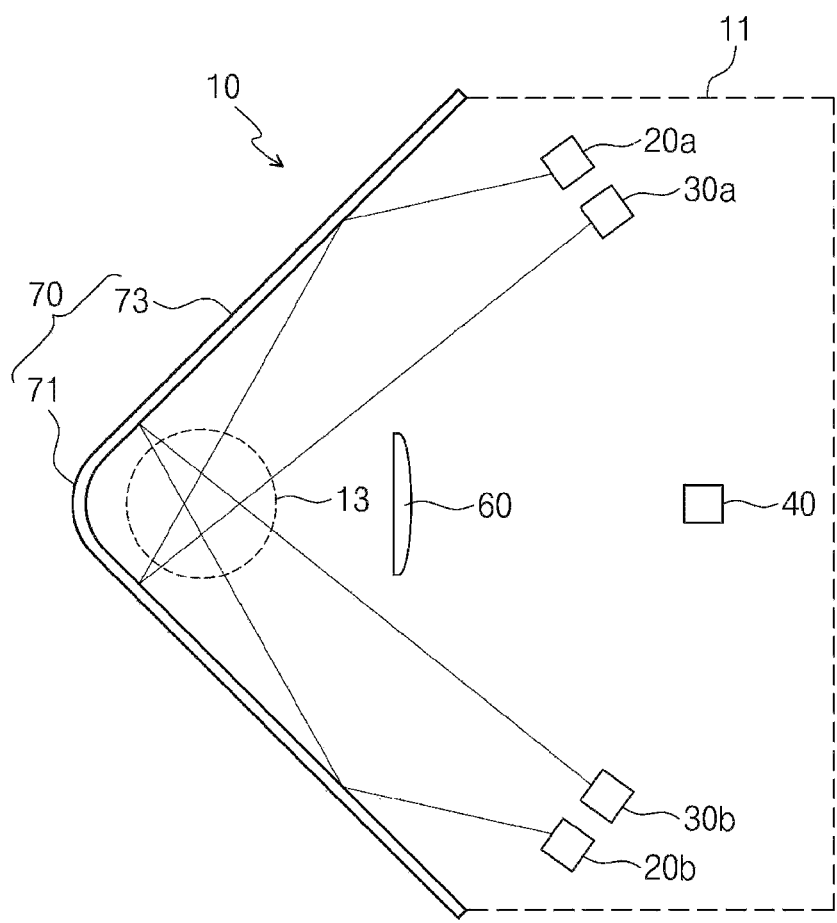

[FIG. 10]
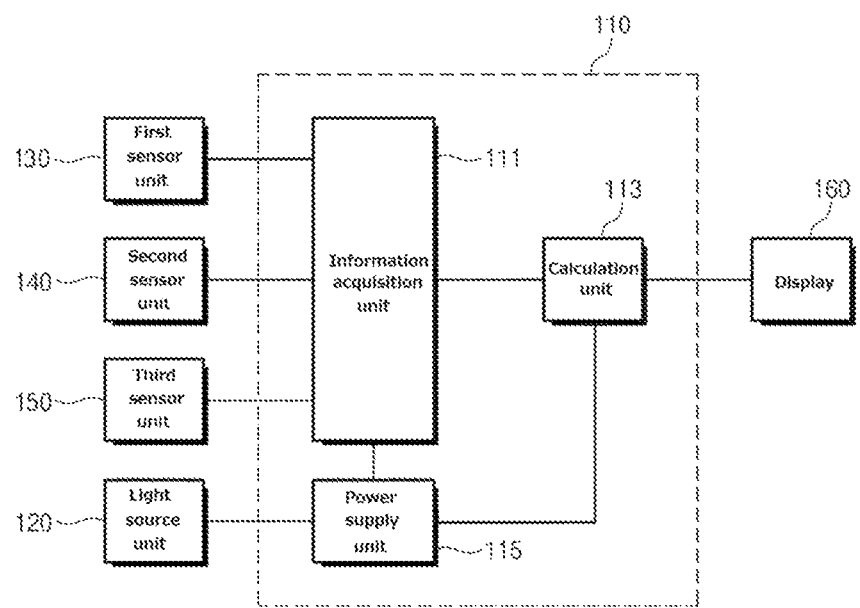

[FIG. 11]
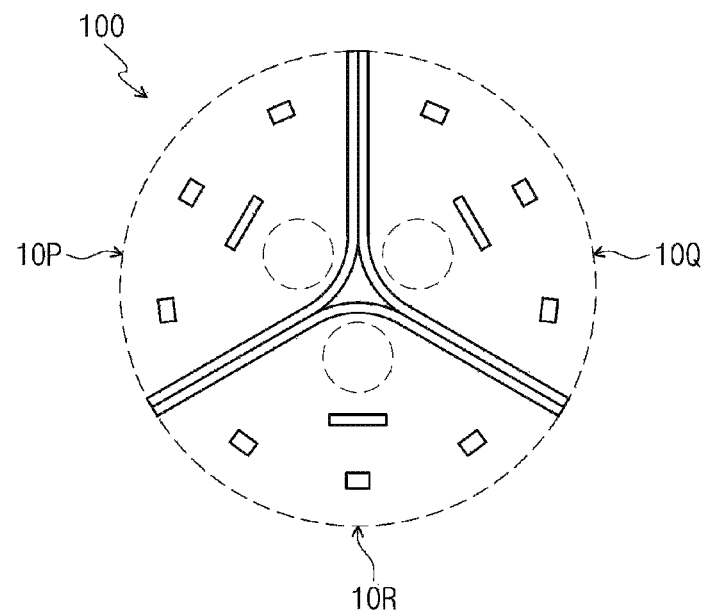
[FIG. 12]
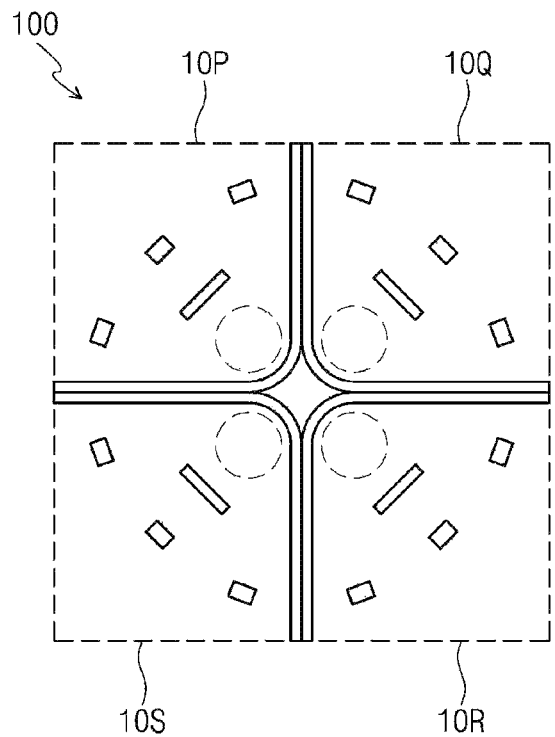

DETECTOR

CROSS-REFERENCE OF RELATED APPLICATIONS

The present application is a continuation of PCT Application No. PCT/KR2018/010066 filed Aug. 30, 2018, entitled "DETECTOR," which claims priorities and the benefits of Korean Patent Application No. 10-2017-0110553 filed on Aug. 31, 2017. The contents of each application noted above are incorporated by reference in their entirety.

TECHNICAL FIELD

The present disclosure relates to a detector, and more particularly, to a detector for detecting biological and/or non-biological particles.

BACKGROUND ART

Recently, elements that require high density and high purity, such as semiconductors, have been developed. A foreign substance such as dust, bacteria, and the like should be minimized to manufacture such elements, and strict control for such foreign substance is required. In addition, the strict control for such foreign substance is also required in various fields other than a field such as a semiconductor element, for example, a medical field and the like.

Accordingly, a detector including instant information about a type of the foreign substance, an amount of the foreign substance, a density of the foreign substance, and the like is required.

DETAILED DESCRIPTION OF THE INVENTION

Technical Problem

The present disclosure aims to provide a detector having a high sensing efficiency that may efficiently perform qualitative and quantitative analyses on a particle type, a particle amount, and the like at once. The present disclosure also aims to provide a compact detector.

Technical Solution

According to an exemplary embodiment, a detector has an internal sensing space, and includes a light source unit for emitting light into the sensing space, a reflector for reflecting the light and including a pair of extensions respectively extending in different directions, a sample supply for providing a sample into a path of the light, a first sensor unit for sensing the light reflected by the reflector, and a second sensor unit for sensing at least one of scattered light and fluorescence by the sample. The light source and the first and second sensor units are arranged in the sensing space, wherein an angle formed by a pair of extensions is set based on a traveling path of the light, and wherein a portion of the light emitted from the light source unit has a path of being reflected by one of the extensions, then being reflected by the other of the extensions, and then traveling toward the first sensor unit.

According to an exemplary embodiment, the light source unit may emit at least one wavelength band of infrared light, visible light, and ultraviolet light.

According to an exemplary embodiment, the light source unit may emit a wavelength band of 210 to 1200 nm.

According to an exemplary embodiment, the light source unit may include at least one light source.

According to an exemplary embodiment, the light source unit may include a plurality of light sources emitting light of different wavelengths.

According to an exemplary embodiment, at least one of the first sensor unit and the second sensor unit may include at least one sensor corresponding to the light source unit.

According to an exemplary embodiment, the light source unit may emit light of a wavelength corresponding to a size of a target to be sensed, and wherein at least one of the first sensor unit and the second sensor unit may sense the light of the wavelength corresponding to the size of the target.

According to an exemplary embodiment, the first sensor unit may include at least one of a first infrared light sensor, a first visible light sensor, and a first ultraviolet light sensor.

According to an exemplary embodiment, the second sensor unit may include at least one of a second infrared light sensor, a second visible light sensor, and a second ultraviolet light sensor.

According to an exemplary embodiment, the detector may further include a third sensor unit disposed adjacent to the light source unit and sensing an amount of the light emitted from the light source unit.

According to an exemplary embodiment, the third sensor unit may include at least one of a third infrared light sensor, a third visible light sensor, and a third ultraviolet light sensor.

According to an exemplary embodiment, the reflector may further include a light condenser having a cross-section forming a portion of a curve, and the two extensions respectively extending from both ends of the light condenser and formed in a plate shape, wherein the angle between the two extensions may be 80 degree to 110 degree.

According to an exemplary embodiment, the detector may further include an optical lens unit disposed between the reflector and the second sensor unit.

According to an exemplary embodiment, the detector may further include a polarizing filter disposed on the path of the light and polarizing the light.

According to an exemplary embodiment, the detector may further include a heater for providing heat to the sensing space.

According to an exemplary embodiment, the light source unit, the reflector, the sample supply, the first sensor unit, and the second sensor unit may constitute a detection module, and wherein the detector may include a plurality of detection modules.

According to an exemplary embodiment, light emitted from the light source units of the respective detection modules may have wavelengths at least partially different from each other.

According to an exemplary embodiment, the light source unit may include a light emitting diode.

According to an exemplary embodiment, the sample may be provided as fluid.

According to an exemplary embodiment, the detector may further include an information acquisition unit for acquiring information about a target in the sample using values sensed by the first sensor unit and the second sensor unit, and a display for displaying the target information to a user.

According to an exemplary embodiment, the detector may further include a calculation unit for receiving the target information from the information acquisition unit, calculating the target information, and providing the calculated target information to the display.

According to an exemplary embodiment, the detector may sense at least one of dust, a germ, a mold, and a virus present in the sample.

Advantageous Effects of the Invention

The present disclosure provides a detector that is compact and has a high detectability of a predetermined particle.

BRIEF DESCRIPTION OF THE DRAWINGS

FIG. 1 is a cross-sectional view illustrating a detector according to an embodiment of the present disclosure.

FIG. 2 is a cross-sectional view illustrating a detector according to another embodiment of the present disclosure.

FIG. 3 is a cross-sectional view illustrating a detector according to further another embodiment of the present disclosure.

FIG. 4 is a cross-sectional view illustrating a detector according to further another embodiment of the present disclosure.

FIG. 5 is a cross-sectional view illustrating a detector according to further another embodiment of the present disclosure.

FIG. 6 is a cross-sectional view illustrating a detector according to further another embodiment of the present disclosure.

FIG. 7 is a cross-sectional view illustrating a detector according to further another embodiment of the present disclosure.

FIGS. 8 and 9 are cross-sectional views illustrating a detector according to further another embodiment of the present disclosure.

FIG. 10 is a block diagram schematically illustrating a configuration of a detector for describing a method for driving a detector according to an embodiment of the present disclosure.

FIGS. 11 and 12 are conceptual diagrams illustrating a detector according to one embodiment of the present disclosure.

DETAILED DESCRIPTION OF PREFERRED EMBODIMENTS

The present disclosure may be variously modified and may have various forms, so that specific embodiments will be illustrated in the drawings and described herein. However, this is not intended to limit the present disclosure to specific disclosure forms, and it is to be understood that all changes, equivalents, and substitutes are included in the spirit and scope of the present disclosure.

Hereinafter, with reference to the accompanying drawings, a preferred embodiment of the present disclosure will be described in detail.

FIG. 1 is a cross-sectional view illustrating a detector according to an embodiment of the present disclosure.

An embodiment of the present disclosure relates to a detector, and particularly, to a detector for detecting dust, a germ, a mold, a virus, and predetermined gas, and the like present in a sample provided as fluid. In other words, the present disclosure relates to a detector for detecting a non-biological particle composed of at least one of organic or inorganic materials and/or a biological particle such as a cell, a bacterium, the virus, and the like. Hereinafter, the biological and/or the non-biological particles made of the organic material and/or the inorganic material such as the dust, the germ, the molds, the virus, and the like are collectively referred to as a "particle". The fluid may be air, aerosol, and the like.

In an embodiment of the present disclosure, the dust, which includes an organic molecule, an inorganic molecule, organic/inorganic molecular complexes, predetermined gas ($SO_2$, $NO_2$, $O_3$, and the like), refers to the non-biological particle having a predetermined size. The germ, the mold, the virus, and the like refer to the biological particle. The dust, the germ, the mold, the virus, and the like may be particles of various sizes ranging from nanometers to millimeters.

Referring to FIG. 1, a detector 10 according to an embodiment of the present disclosure has a sensing space 11 defined therein for detecting a particle 90 provided therein. The detector 10 includes a light source unit 20 for emitting light into the sensing space 11, a reflector 70 for reflecting the light, a sample supply (not shown) for providing a sample including the particle 90 into a path through which the light passes, and a sensor unit disposed in the sensing space 11.

The sensing space 11 is a space in which the light source unit 20, the reflector 70, the sample supply, the sensor unit, and the like may be installed. The sensing space 11 is not particularly limited in shape or size as long as the detection of the particle 90 in the sample is able to be achieved when the sample is supplied into the sensing space 11. The sensing space 11 shown in FIG. 1 is shown as having an approximately pentagonal cross section, but this is conceptually illustrated for convenience of description, and an actual shape of the sensing space 11 may be different therefrom.

A reaction zone 13 in which the sample primarily resides and a reaction between the light from the light source unit 20 and the sample takes place is defined in the sensing space 11. In this connection, the reaction between the light and the sample (or the particle in the sample) means that not only reflection and/or scattering of the light by the sample, but also an occurrence of a physicochemical change, such as absorption of a portion of the light by the sample, occurrence of a fluorescence reaction after the portion of the light being absorbed, or the like. A location of the reaction zone 13 may not be particularly limited, but may be a location, which is provided on the traveling path of the light emitted from the light source unit 20 to be described later and with a high light condensing efficiency. Accordingly, the reaction between the light and the sample may occur easily.

The light source unit 20 provides the light to the sample. The light source unit 20 emits light of various wavelength bands based on a size, a type, a characteristic, and the like of a material to be sensed. For example, the light source unit 20 may emit at least one wavelength band of infrared light, visible light, and ultraviolet light. In an embodiment of the present disclosure, the light source unit 20 may emit a wavelength band of 210 to 1200 nm.

The light emitted from the light source unit 20 may be light of a single wavelength having a small half-width, or may be light including a wide wavelength band. The wavelength band of the light from the light source unit 20 may be variously set depending on a type of the particle 90, whether the reaction with the particle 90 occurs, and a type of the sensor unit.

The light source unit 20 may be selected to emit light of a relatively large wavelength in consideration of a size of the particle 90 when a target to be sensed, that is, the particle 90 is large. When the size of the particle 90 to be sensed is small, the light source unit 20 may be selected to emit light of a relatively small wavelength in consideration of the size of the particle 90. Alternatively, when the particle 90 to be sensed absorbs light of a specific wavelength, or absorbs the light of the specific wavelength and then emits fluorescence, the light source unit 20 may be selected to emit light in a wavelength band corresponding to the absorbed wavelength of such particle 90.

In an embodiment of the present disclosure, when the particle to be sensed contains a fluorescence substance, the light source unit 20 may be selected to emit light in a wavelength band capable of exciting the fluorescence substance. In particular, when the particle to be sensed is the biological particle 90, the light source unit 20 may be selected to emit light in a wavelength band capable of exciting a fluorescence substance in the biological particle 90, and in this case, the light source unit 20 may emit ultraviolet light and/or visible light.

The light source unit 20 according to the present disclosure may emit ultraviolet light corresponding to the fluorescence substance in the particle 90 when the particle 90 reacts with the light to cause the fluorescence reaction. For example, when the fluorescence substance in the particle 90 is NADH, the light source unit 20 may emit ultraviolet light in a wavelength band of 340 nm. Further, when the fluorescence substance is riboflavin, the light source unit 20 may emit ultraviolet light in a wavelength band of 450 nm.

In more detail, the fluorescence reaction is one of phenomena in which a material emits light by stimulation by light. The fluorescence reaction is characterized in that a wavelength of the incident light and a wavelength band of the emitted light are different from each other. The biological particle among the particles 90 may include the fluorescence substance causing the fluorescence reaction. For example, when ultraviolet light in a wavelength band of 280 nm is irradiated, tryptophan, tyrosine, phenylalanine, fluorescence amino acid, and the like in the biological particle are excited to emit fluorescence light in a wavelength of 350 nm. Alternatively, when the ultraviolet light in the wavelength band of 340 nm is irradiated, a NADH material (or NADPH) in the biological particle is excited to emit fluorescence light in a wavelength of 450 nm. Alternatively, when the ultraviolet light in the wavelength band of 450 nm is irradiated, riboflavin in the biological particle is excited to emit fluorescence light in a wavelength of 520 nm. Therefore, it is determined which fluorescence substance is contained and whether the particle 90 is contained in the atmosphere through such fluorescence substance by irradiating light corresponding to the biological particle 90 to the atmosphere, and by detecting fluorescence light emitted by the irradiated light.

In an embodiment of the present disclosure, when the light source unit 20 emits the light in the ultraviolet and/or visible light wavelength band, the dust, a microorganism, and the mold are able to be detected.

In an embodiment of the present disclosure, the light source unit 20 may emit light in an ultraviolet light wavelength band of about 220 to about 1200 nm to detect the dust, the microorganism, the mold, and the like. The dust may be detected by light in a wavelength band of about 220 to 1200 nm, and the microorganism and the mold may be detected by light in a wavelength band of about 220 to about 450 nm.

The light source unit 20 is able to emit light of a specific wavelength, so that various light sources may be used as the light source unit 20. In an embodiment of the present disclosure, the light source unit 20 may include at least one light source. Each light source may include a light emitting diode, a laser, a lamp, and the like, and each light source may be supplied in a form of a pulse.

The reflector 70 reflects the light emitted from the light source unit 20 to change the path of the light. The reflector 70 may be made of a highly reflective material (e.g., various metals such as aluminum, silver, nickel, tungsten, palladium, gold, and the like), or may be coated with the highly reflective material. The light emitted from the light source unit 20 may be reflected by the reflector 70 at least one time.

The reflector 70 reflects the light emitted from the light source unit 20 at least once. The light emitted from the light source unit 20 passes a zone in which the sample is provided by being reflected at least once by the reflector 70. The light reflected by the reflector 70 travels toward the reaction zone 13 again or toward the sensor unit.

The reflector 70 includes a light condenser 71 whose cross-section forms a portion of a curve, and a pair of extensions 73 respectively extending from both ends of the light condenser 71.

The light condenser 71 has a shape of a curve that is convex to one side when viewed on a cross-section. For example, the light condenser 71 may have a shape of a portion of a circle convex to one side, that is, a shape of an arc. Alternatively, the light condenser 71 may be a portion of an ellipse, a parabola, or the like that is convex to one side. In an embodiment of the present disclosure, for convenience of description, the light condenser 71 is shown in a shape of an arc convex in a left direction.

In an embodiment of the present disclosure, the location of the reaction zone 13 in which the reaction between the light and the sample occurs may not be particularly limited, but the reaction zone 13 may be defined at a position adjacent to the light condenser 71. This is because the detection of the sample is easy when the reaction zone 13 is provided at the location, which is on the traveling path of the light emitted from the light source unit 20 to be described later and with the high light condensing efficiency.

One of the pair of extensions 73 is elongated along a straight line extending from one end of the light condenser 71, for example, from one end of the arc, when viewed on a cross-section. The other of the pair of extensions 73 is elongated along a straight line extending from the other end of the light condenser 71, for example from the other end of the arc, when viewed on a cross-section. Each extension 73 has a straight line shape when viewed on a cross-section, but may actually be in a plate shape.

In an embodiment of the present disclosure, the two extensions 73 are connected to each other with the light condenser 71 interposed therebetween, and do not directly form a predetermined angle, but the extension lines of the two extensions 73 form the predetermined angle. The angle formed by the two extensions 73 may be set to various values depending on the path of the light from the light source unit 20 travels. Directions of reflection and travel of the light may be changed by adjusting the angle formed by the two extensions 73. In particular, the value of the angle formed by the two extensions 73 with the light condenser 71 interposed between may be changed based on a location of the light source unit 20 to be described later or a location of the sensor unit. In this connection, the value of the angle may be set such that the light passes through the reaction zone 13. In an embodiment of the present disclosure, the angle formed by the two extensions 73 may be about 80 degree to about 110 degree.

In an embodiment of the present disclosure, the value of the angle formed by the two extensions 73 may be set such that the light passes through the reaction zone 13 based on an angle at which the light emitted from the light source unit 20 is reflected. In an embodiment of the present disclosure, as shown in FIG. 1, the angle formed by the two extensions 73 may be about 90 degrees.

Although not shown, the sample supply for supplying the sample is disposed in the sensing space 11. The sample supply may be provided in a form of a nozzle having an opening in the sensing space 11, and the sample is provided as the fluid through the nozzle. The fluid may be, for example, an aerosol. A sample outlet for discharging the sample may also be disposed in the sensing space 11, and the fluid inside the sensing space 11 is discharged to the outside through the sample outlet.

The nozzle of the sample supply is disposed adjacent to the reaction zone 13 or provided at a location where the sample may flow to the reaction zone 13 even when not being adjacent to the reaction zone 13. The reaction zone 13 may be located on the path through which the light emitted from the light source unit 20 to be described later travels, for example, on a path through which the light emitted from the light source unit 20 travels after being reflected one time.

The sensor unit senses the light reflected by the reflector 70 and light reflected, scattered, and fluorescenced by the sample. The sensor unit has a first sensor unit 30 for sensing the light reflected by the reflector 70 and a second sensor unit 40 for sensing the light scattered, reflected, absorbed, and/or fluorescenced by the sample.

The first sensor unit 30 is disposed on a path through which the light emitted from the light source unit 20 travels when there is no particle 90 to be sensed, and senses light that does not meet the particle 90. The light sensed by the first sensor unit 30 is light reflected by the reflector 70 at least once after being emitted from the light source, and corresponds to light that does not react with the particle 90 to be sensed.

The second sensor unit 40 senses the light by the scattering, the reflection, the absorption, and the fluorescence when the particle 90 to be sensed and the light source meet each other and the reaction such as the scattering, the reflection, the absorption, the fluorescence, and the like by the particle 90 occurs. That is, the light sensed by the second sensor unit 40 is the light reflected by the reflector 70 at least once after being emitted from the light source unit 20, and corresponds to light reacted with the particle 90 to be sensed. Accordingly, the second sensor unit 40 is provided at a location opposite the reflector 70 with the reaction zone 13 interposed therebetween.

When the path of the light that does not meet the particle 90 to be sensed among the light emitted from the light source unit 20 is referred to as a first path P1, and when a path changed by the scattering, the reflection, the absorption, the fluorescence, and the like after the reaction such as the scattering, the reflection, the absorption, the fluorescence, and the like by the particle 90 occurred as the light among the light emitted from the light source unit 20 meets the particle 90 being sensed is referred to as a second path P2, the first sensor unit 30 is disposed on the first path P1 and the second sensor unit 40 is disposed on the second path P2. In this connection, the first and second paths P1 and P2 of the illustrated light represent only a rough directionality of many paths of the light for convenience of description. Not all the light emitted from the light source unit 20 travels in the illustrated form, and some of the emitted light may travel in different directions.

In an embodiment of the present disclosure, the first sensor unit 30 is composed of sensors for sensing the light emitted from the light source unit 20. Accordingly, the sensors may be selected to sense the same wavelength band as the wavelength band emitted by the light source unit 20. For example, when the light emitted from the light source unit 20 is the ultraviolet light, the first sensor unit 30 includes an ultraviolet light sensor. When the light emitted from the light source unit 20 is the visible light, the first sensor unit 30 includes a visible light sensor. When the light emitted from the light source unit 20 is the infrared light, the first sensor unit 30 includes an infrared light sensor.

In an embodiment of the present disclosure, the second sensor unit 40 is composed of sensors for sensing the light emitted from the light source unit 20 and the scattered, reflected, absorbed, and fluorescenced light. Accordingly, the second sensor unit 40 may be composed of sensors that sense light with a wavelength equal to or different from the wavelength of the light emitted from the light source unit 20.

For example, when the light emitted from the light source unit 20 is the ultraviolet light, the first sensor unit 30 may be the ultraviolet light sensor, but it may include the sensor of the visible light or the infrared light having a larger wavelength than the ultraviolet light. This is because the light has the same wavelength as an original wavelength when the light is scattered or reflected by the particle 90, but the light may emit light having a wavelength larger than an absorbed wavelength when the fluorescence occurs. When the light emitted from the light source unit 20 is the visible light, the first sensor unit 30 may be the visible light sensor, or may be the sensor of the infrared having a larger wavelength than the visible light. In the same form, when the light emitted from the light source unit 20 is the infrared light, the first sensor unit 30 may be the infrared light sensor, or may be the sensor for sensing a larger wavelength than the infrared light.

In an embodiment of the present disclosure, the second sensor unit 40 may in particular sense the fluorescence. Because autofluorescence by the microorganism is a very fine signal, the second sensor unit 40 may apply, for example, a PMT (Photo Multiplying Tube) as a detection sensor.

In an embodiment of the present disclosure, an optical lens unit 60 may be disposed between the reflector 70 and the second sensor unit 40, specifically, between the reaction zone 13 and the second sensor unit 40. The optical lens unit 60 serves to change a path such that light from the reaction zone 13 travels to the second sensor unit 40, and to condense the light.

Because the light emitted from the reaction zone 13 may spread in various directions, it is necessary to condense such light toward the second sensor unit 40. The optical lens unit 60 converts the scattered, reflected, and fluorescenced light emitted from the reaction zone 13 into parallel light and condenses the parallel light on the second sensor unit 40.

In the drawing, the optical lens unit 60 is illustrated as one convex lens, but is not limited thereto. The optical lens unit 60 may include various sizes and various types of optical lenses. For example, the optical lens unit 60 may be composed of a singular lens or a combination of a plurality of optical lenses. For example, only a light beam very close to an optical axis is converted into the parallel light using a single aspherical lens, so that light of various paths spreading at a wide angle may be converted into the parallel light or into converging light using the plurality of lenses. In an embodiment of the present disclosure, the optical lens unit 60 may include a first lens for condensing the light emitted from the reaction zone 13 and a second lens for spreading the condensed light to a predetermined area. The optical lens unit 60 efficiently provides the light from the reaction zone 13 to the second sensor unit 40 based on an arrangement of such various lenses.

In an embodiment of the present disclosure, the optical lens unit 60 is illustrated as being disposed only between the reaction zone 13 and the second sensor unit 40, but is not limited thereto. The optical lens unit 60 may be disposed at another location wherever a partial change of the path of the light and improvement of the light condensing efficiency are required. For example, the optical lens unit 60 may be disposed between the reflector 70 and the first sensor 31.

The detector 10 according to an embodiment of the present disclosure detects the particle 90 along a following path.

The light is emitted from the light source unit 20, and the emitted light is reflected by the reflector 70. The reflected light passes through the reaction zone 13, a portion of the light in the reaction zone 13 causes the scattering, the reflection, the absorption, the fluorescence reaction, and the like by the particle 90, and remaining light passes through the reaction zone 13 without meeting the particle 90. When the particle 90 is present in the reaction zone 13, the light passing through the reaction zone 13 is scattered, reflected, absorbed, and fluorescenced by the particle 90. When an amount of the particles 90 increases, an amount of the reaction with the light increases, and an amount of the light passing through the first path P1 decreases in inverse proportion to a degree of the reaction. The penetrated light is reflected by the reflector 70 and sensed by the first sensor unit 30 along the first path P1. The first sensor unit 30 may compare an amount of the light emitted from the light source unit 20 with a decreased amount of light sensed by the first sensor unit 30 to identify the size, the type, the amount, a density, and the like of the particle 90.

In addition, when the light emitted from the light source unit 20 and reflected by the reflector 70 meets the particle 90 in the reaction zone 13 to cause the scattering, the reflection, the absorption, and the fluorescence by the particle 90, the light by the scattering, the reflection, the absorption, the fluorescence reaction, and the like deviates from the first path P1. The light deviated from the first path P1 may be provided to the second sensor unit 40 along the second path P2. In other words, the light by the scattering, the reflection, the absorption, and the fluorescence reaction may travel directly toward the second sensor unit 40, or may travel toward the second sensor unit 40 after being reflected again by the reflector 70. The light traveling along the second path P2 is condensed at the optical lens unit 60 and then sensed by the second sensor unit 40. The second sensor unit 40 may sense a wavelength, an amount, and the like of the light by the scattering, the reflection, the absorption, and the fluorescence reaction to identify the size, the type, the amount, the density, and the like of the particle 90.

In this connection, the light by the scattering, the reflection, the absorption, the fluorescence, and the like is illustrated as traveling only to the second path P2, but is not limited thereto. The light may travel along the first path P1 or the light may travel along another path not illustrated. Thus, when necessary, the first sensor unit 30 may sense the light by the scattering, the reflection, the absorption, and the fluorescence reaction, and an additional sensor unit other than the first sensor unit 30 or the second sensor unit 40 may be further mounted.

In an embodiment of the present disclosure, the scattering or the reflection may occur when the non-biological particle 90 meets the light, and fluorescence light may be emitted when the biological particle 90 meets the light. The second sensor unit 40 may receive the light by the scattering or the reflection, or may receive the light by the fluorescence. In a case of the scattering or the reflection, there is no change in a wavelength band between emitted light and received light. However, in a case of the fluorescence, there is a change in a wavelength band between emitted light and received light, so that the biological particle 90 may be identified. In addition, because the biological particle 90 may emit fluorescence light of a specific wavelength band depending on the fluorescence substance therein, the type of biological particle 90 may be identified.

When further describing the case of the biological particle 90, the reason why the fluorescence light is emitted when the ultraviolet light is irradiated is because the biological particle 90 contains the fluorescence substance. In this connection, excitation of the fluorescence substance is required for the fluorescence substance to emit the fluorescence light. Wavelength bands of incident light for the excitation and emitted ultraviolet light are different for each fluorescence substance. Therefore, it may determine which biological particle 90 is contained in the air by detecting the fluorescence light emitted by irradiating the ultraviolet light. In other words, ultraviolet light of a specific wavelength band reacts with a specific fluorescence substance to generate fluorescence light of a specific wavelength band. Thus, when the irradiated ultraviolet light of the specific wavelength is identified and when the fluorescence light of the specific wavelength band emitted when such ultraviolet light meets the air is detected and identified, the specific fluorescence substance that generated the fluorescence light may be identified. Further, because the fluorescence substance is contained in the biological particle 90, using the identified specific fluorescence substance, the biological particle 90 containing the same may be estimated.

According to an embodiment of the present disclosure, the light source unit 20 and the sensor unit are arranged on the same side with respect to the reaction zone 13 in which the particle 90 is provided. The reflector 70 is disposed on a side opposite to the side on which the light source unit 20 and the sensor unit are arranged with respect to the reaction zone 13, that is, the other side. The light source unit 20 and the sensor unit are arranged on the same side, so that a direction of the light emitted from the light source unit 20 for traveling toward the reflector 70 and a direction of the light for traveling from the reflector 70 toward the sensor unit may be substantially parallel with each other. Alternatively, even when the direction of the light emitted from the light source unit 20 for traveling toward the reflector 70 and the direction of the light for traveling from the reflector 70 toward the sensor unit are not parallel with each other, the two directions have opposite directions but they have approximately similar directionalities. In addition, although the light source unit 20 and the sensor unit in the drawing are illustrated as being separated from each other, the light source unit 20 and the sensor unit may be arranged to be adjacent to each other in an actual structure.

According to an embodiment of the present disclosure, as the light emitted from the light source unit 20 is sensed by at least one of the first sensor unit 30 and the second sensor unit 40 along the path, qualitative and quantitative analyses about the type of the particle 90, the amount of the particle 90, and the like may be efficiently performed at once.

In addition, the particle 90 may be qualitatively and quantitatively analyzed irrespective of whether the particle 90 is living or non-living, and in particular, qualitative and quantitative analyses about the germ, the bacterium, the virus, and the like may be easy by measuring the light by the fluorescence reaction. In addition, because the traveling directions of the light in the sensing space 11 of the detector 10 are substantially parallel directions or directions generally similar to the parallel directions, the light source unit 20 and the sensor unit may be arranged in a narrow region on the same side in the sensing space 11. As a result, the detector 10 may be miniaturized.

Embodiments of the Present Disclosure

According to another embodiment of the present disclosure, the second sensor unit 40 may include a single sensor, or may include a plurality of sensors that sense light having different wavelengths. In following embodiments, a difference from the above-described embodiment will be described mainly to avoid duplication of description.

FIG. 2 is a cross-sectional view illustrating the detector 10 according to an embodiment of the present disclosure.

Referring to FIG. 2, the second sensor unit 40 may include a plurality of sensors. For example, the second sensor unit 40 may include three sensors, that is, first to third sensors 41, 43, and 45. However, a number of sensors is not limited thereto, and two or four or more sensors may be included.

The first to third sensors 41, 43, and 45 of the second sensor unit 40 may be sensors that sense light of different wavelengths. For example, the first sensor 41 may sense light of a first wavelength, the second sensor 43 may sense light of a second wavelength different from the first wavelength, and the third sensor 45 may sense light having a third wavelength different from the first and second wavelengths. It is sufficient that the first to third wavelengths are different wavelengths. For example, the first wavelength may correspond to one of the ultraviolet light, the visible light, and the infrared light wavelength bands, the second wavelength may also correspond to one of the ultraviolet light, the visible light, and the infrared light wavelength bands, and the third wavelength may also correspond to one of the ultraviolet light, the visible light, and the infrared light wavelength bands. Accordingly, various combinations of the wavelength bands in which each of the first to third wavelengths corresponds to the ultraviolet light band or in which one of the first to third wavelengths is the ultraviolet light and the others correspond to the visible light band are available.

According to an embodiment of the present disclosure, the light of the first wavelength, the second wavelength, and the third wavelength respectively sensed by the first to third sensors 41, 43, and 45 may correspond to the ultraviolet light, to the visible light, and to the infrared light, respectively.

According to the present embodiment, light of a predetermined wavelength band is emitted from the light source unit 20, and the emitted light is reflected through the reflector 70. The reflected light passes through the reaction zone 13, and is sensed by the first sensor unit 30 along the first path P1. The first sensor unit 30 may compare the amount of the light emitted from the light source unit with the decreased amount of the light sensed by the first sensor unit 30 to identify the size, the type, the amount, the density, and the like of the particle 90.

In addition, when the light emitted from the light source unit 20 and reflected by the reflector 70 meets the particle 90 in the reaction zone 13, the particle 90 causes the scattering, the reflection, the absorption, and the fluorescence reaction. The light by the scattering, the reflection, the absorption, and the fluorescence reaction may be provided to the second sensor unit 40 along the second path P2. Light that is scattered or reflected among the light traveling to the second sensor unit 40 does not change in the wavelength band, but light that is absorbed or fluorescenced may be changed to different first to third wavelength bands from the first to third wavelength bands. Such changed wavelength band is sensed by the second sensor unit 40 after the light is condensed at the optical lens unit 60. The second sensor unit 40 has the first to third sensors 41, 43, and 45 based on the wavelength band, so that the size, the type, the amount, the density, and the like of the particle 90 may be identified in detail by sensing the wavelength, the amount of light, or the like by the scattering, the reflection, the absorption, and the fluorescence reaction.

In the present embodiment, it has been described that the second sensor unit 40 includes a plurality of sensors, but it is not limited thereto. In another embodiment of the present disclosure, the first sensor unit 30 may include a plurality of sensors. In one example, each of both the first sensor unit 30 and the second sensor unit 40 may include a plurality of sensors.

FIG. 3 is a cross-sectional view illustrating the detector 10 according to another embodiment of the present disclosure.

Referring to FIG. 3, the first sensor unit 30 may include a plurality of sensors. For example, the first sensor unit 30 may include three sensors, that is, first to third sensors 31, 33, and 35. However, the number of sensors is not limited thereto, and two or four or more sensors may be included.

The first to third sensors 31, 33, and 35 may be sensors that sense light of different wavelengths. For example, the first sensor 31 may sense the light of the first wavelength, the second sensor 33 may sense the light of the second wavelength different from the first wavelength, and the third sensor 35 may sense the light having the third wavelength different from the first and second wavelengths. It is sufficient that the first to third wavelengths are different wavelengths. For example, the first wavelength may correspond to one of the ultraviolet light, the visible light, and the infrared light wavelength bands, the second wavelength may also correspond to one of the ultraviolet light, the visible light, and the infrared light wavelength bands, and the third wavelength may also correspond to one of the ultraviolet light, the visible light, and the infrared light wavelength bands. Accordingly, various combination of wavelength bands are available, such as a combination that each of the first to third wavelengths corresponds to the ultraviolet light band, a combination that one of the first to third wavelengths is the ultraviolet light and the others correspond to the visible light band.

According to an embodiment of the present disclosure, the light of the first wavelength, the second wavelength, and the third wavelength respectively sensed by the first to third sensors 31, 33, and 35 may respectively correspond to the ultraviolet light, to the visible light, and to the infrared light.

In more detail, depending on the size or the type of the particle 90 present in the reaction zone 13, light of different wavelengths may cause the reflection, the scattering, the absorption, and the fluorescence. For example, when there are a large number of particles 90 that absorb or scatter the light of the second wavelength band in the reaction zone 13, among the light passing through the reaction zone 13 and traveling to the first path P1, an amount of the light of the first wavelength band or an amount of the light of the third wavelength band are maintained while an amount of the light of the second wavelength band is decreased. The second sensor 33 may identify the particle 90 that absorbs or scatters the light of the second wavelength band by measuring a decrease in the amount of the light of the second wavelength band.

When the wavelength is too longer or shorter than the size of the particle 90, it is difficult to sense the particle 90. However, according to the present embodiment, as the plurality of sensors that sense the light of various wavelength bands are used, a range of measurement available depending on the size of the particle 90 is increased. In other words, the particles 90 of various sizes may be sensed by including the sensors for different wavelength bands.

According to another embodiment of the present disclosure, the light source unit 20 may include a plurality of light sources emitting light of different wavelengths. In the above-described embodiment, the structure of the light source unit 20 including one light source has been described, but in the present embodiment, the light source unit 20 may include a plurality of light sources emitting the light of the different wavelength bands.

FIG. 4 is a cross-sectional view illustrating the detector 10 according to another embodiment of the present disclosure.

Referring to FIG. 4, the light source unit 20 may include a plurality of light sources. For example, the light source unit 20 may include three light sources, that is, first to third light sources 21, 23, and 25. However, a number of light sources is not limited thereto, and two, four or more light sources may be included.

The first to third light sources 21, 23, and 25 may be light sources that emit light of different wavelengths. For example, the first light source 21 may emit the light of the first wavelength, the second light source 23 may emit the light of the second wavelength different from the first wavelength, and the third light source 25 may emit the light having the third wavelength different from the first and second wavelengths. It is sufficient that the first to third wavelengths are different wavelengths. The first wavelength may correspond to one of the ultraviolet light, the visible light, and the infrared light wavelength bands, the second wavelength may also correspond to one of the ultraviolet light, the visible light, and the infrared light wavelength bands, and the third wavelength may also correspond to one of the ultraviolet light, the visible light, and the infrared light wavelength bands. Accordingly, various combinations of wavelength bands, such as a combination that each of the first to third wavelengths corresponds to the infrared light band, a combination that one of the first to third wavelengths is the visible light and the others correspond to the ultraviolet light band, etc. are available.

Each of the first sensor unit 30 and the second sensor unit 40 may also be composed of sensors that sense light of different wavelengths. For example, the first sensor unit 30 may include the first sensor 31 to the third sensor 35 that sense the light of the different wavelengths, and the second sensor unit 40 may also include the first sensor 41 to the third sensor 45 that sense the light of the different wavelengths.

The sensors of each of the first sensor unit 30 and the second sensor unit 40 are sufficient to respectively detect the first to third wavelength bands different from each other, and various wavelength band combinations are available.

In FIG. 4, it has been illustrated that the light from the first light source 21 is sensed by the first sensor 31 of the first sensor unit 30, the light from the second light source 23 is sensed by the second sensor 33 of the first sensor unit 30, and the light from the third light source 25 is sensed by the third sensor 35 of the first sensor unit 30, but this is for convenience of description, which may be set differently based on a sensing band of each sensor. For example, the light emitted from the first light source 21 may be sensed by the second sensor 33 of the first sensor unit 30, and may be combined in another form in another embodiment.

According to an embodiment of the present disclosure, the light of the first wavelength, the second wavelength, and the third wavelength respectively emitted from the first to third light sources 21, 23, and 25 may respectively correspond to the ultraviolet light, to the visible light, and to the infrared light. Further, the light of the first wavelength, the second wavelength, and the third wavelength respectively sensed by the first sensors 31 and 41, the second sensors 33 and 43, and the third sensors 35 and 43 of the first sensor unit 30 and the second sensor unit 40 may respectively correspond to the ultraviolet light, to the visible light, and to the infrared light.

According to the present embodiment, the light of the different wavelengths is emitted from the light source unit 20 and the emitted light is reflected by the reflector 70. The reflected light passes through the reaction zone 13 and is sensed by the first sensor unit 30 along the first path P1. The first sensor unit 30 may compare the amount of the light emitted from the light source unit sequentially based on wavelengths with the decreased amount of the light sensed by the first sensor unit 30 to identify the size, the type, the amount, the density, and the like of the particle 90. In the present embodiment, the wavelength band of the light from the light source unit 20 is subdivided into the first to third wavelength bands, so that the size, the type, the amount, the density, and the like of each particle 90 may be identified specifically and accurately.

In addition, when the light of the various wavelength bands (that is, the light of the first to third wavelength bands) emitted from the light source unit 20 and reflected by the reflector 70 meets the particle 90 in the reaction zone 13, the particle 90 causes the scattering, the reflection, the absorption, and the fluorescence reaction. The light by the scattering, the reflection, the absorption, and the fluorescence reaction may be provided to the second sensor unit 40 along the second path P2. The light that is scattered or reflected among the light traveling to the second sensor unit 40 does not change in the wavelength band, but the light that is absorbed or fluorescenced may be changed to different first to third wavelength bands from the first to third wavelength bands. Such changed wavelength band is sensed by the second sensor unit 40 after the light is condensed at the optical lens unit 60. The second sensor unit 40 has the first to third sensors 41, 43, and 45 based on the wavelength bands, so that the size, the type, the amount, the density, and the like of the particle 90 may be identified in detail by sensing the wavelength, the amount of light, or the like based on the scattering, the reflection, the absorption, and the fluorescence reaction.

The detector 10 according to another embodiment of the present disclosure may have a third sensor unit 50 that measures the amount of the light emitted from the light source unit 20.

FIG. 5 is a cross-sectional view illustrating the detector 10 according to another embodiment of the present disclosure.

Referring to FIG. 5, the third sensor unit 50 that senses the amount of the light from the light source unit 20 is disposed near the light source unit 20. The third sensor unit 50 is for setting a reference value for the amount of the light from the light source unit 20. When the amount of the light from the light source unit 20 sensed by the third sensor unit 50 is less than the reference value, the amount of the light emitted from the light source unit 20 may be increased. On the other hand, when the amount of the light from the light source unit 20 sensed by the third sensor unit 50 is greater than the reference value, the amount of the light emitted from the light source unit 20 may be reduced.

In FIG. 5, it is illustrated that the third sensor unit 50 includes first to third sensors 51, 53, and 55. The first to third sensors 51, 53, and 55 are arranged to respectively correspond to the first to third light sources 21, 23, and 25 to respectively sense the amounts of the light respectively from the first to third light sources 21, 23, and 25, but the present disclosure is not limited thereto. The third sensor unit 50 is for sensing the amount of the light from the light source unit 20, and the number of sensors of the third sensor unit 50 may be different from the number of light sources of the light source unit 20.

According to the present embodiment, because the amount of the light emitted from the light source unit 20 is a predetermined value based on a reference, an erroneous measurement may be reduced during the sensing by the first to second sensor units 30 and 40.

As described above, the detector 10 according to an embodiment of the present disclosure may detect various kinds of the particles 90 through the light source unit 20 and the first to third sensor units 30, 40, and 50.

Table 1 is a table describing types and conditions of the particles 90 that may be detected when the light source unit 20 includes the plurality of light sources and each of the first to third sensor units 30, 40, and 50 includes the plurality of sensors.

As seen in Table 1, depending on the particle to be detected and a type of a reaction with light, the light source unit 20 and the first to third sensor units 30, 40, and 50 may be combined to correspond to various wavelength bands.

TABLE 1

| Application | Type of particle | Light source unit | First sensor unit | Second sensor unit | Third sensor unit |
|---|---|---|---|---|---|
| Scattering | 10 um particle | Infrared light | Infrared light | Infrared light | Infrared light |
| | | Visible light Ultraviolet light | Visible light Ultraviolet light | Visible light Ultraviolet light | Visible light Ultraviolet light |
| Scattering | 2.5 um particle | Infrared light | Infrared light | Infrared light | Infrared light |
| | | Visible light Ultraviolet light | Visible light Ultraviolet light | Visible light Ultraviolet light | Visible light Ultraviolet light |
| Scattering | 1.0 um particle | Infrared light | Infrared light | Infrared light | Infrared light |
| | | Visible light Ultraviolet light | Visible light Ultraviolet light | Visible light Ultraviolet light | Visible light Ultraviolet light |
| Fluorescence/ absorption | Bacterium mold (microorganism) | Ultraviolet light (280 nm) | Ultraviolet light *(280 nm) | Ultraviolet light (330 nm) | Ultraviolet light (280 nm) |
| | | Ultraviolet light (340 nm) | Ultraviolet light ** (340 nm) | Visible light (450 nm) | Ultraviolet light (340 nm) |
| | | Visible light (440 nm) | Visible light *** (440 nm) | Visible light (450 nm) | Visible light (520 nm) |
| Absorption/ scattering | Gas ($SO_2$, $NO_2$, $O_3$, and the like) | Ultraviolet light (280 nm) | Ultraviolet light (280 nm ) | Ultraviolet light (280 nm) | Ultraviolet light (280 nm) |

In Table 1, a section marked with * is a wavelength band at which *E. coli* or Pest bacteria may be detected. A section marked  is a wavelength band at which NADH may be detected. Further, a section marked with * corresponds to a wavelength band at which flavin may be detected. The detector 10 according to another embodiment of the present disclosure may further include additional components for increasing a detection efficiency.

FIG. 6 is a cross-sectional view illustrating the detector 10 according to another embodiment of the present disclosure.

Referring to FIG. 6, the detector 10 may include a heater 81 adjacent to the reaction zone 13 and increasing a reactivity of the particles 90. The heater 81 increases the reactivity of the particles 90 by applying heat in the sensing space 11. When a temperature in the sensing space 11 is high, a kinetic energy and a thermal energy of the particles 90 are increased, thereby increasing a reaction efficiency with light. In one embodiment of the present disclosure, a shape and a location of the heater 81 may vary.

In addition, an appropriate optical filter 83 may additionally be disposed in the detector 10. A type of the optical filter 83 is not particularly limited, but a polarizing filter, a band pass filter, and the like may be used as the optical filter 83.

The optical filter 83 may be disposed on the traveling path of the light. For example, the optical filter 83 may be disposed between the reaction zone 13 and the first sensor unit 30, and/or between the reaction zone 13 and the second sensor unit 40. The optical filter 83 may polarize light such that it is easy to sense the light by the first sensor unit 30 and/or the second sensor unit 40, or may block light that is not sensed by the first sensor unit 30 and/or the second sensor unit 40, thereby filtering the light.

In this case, a portion of the light scattered by the components of the detector 10 may act as a noise signal to affect a sensitivity of the first to second sensor units 30 and 40, such noise signal may be removed and only light of a specific wavelength band may be penetrated using the optical filter 83, so that only desired light may be detected.

The detector 10 according to another embodiment of the present disclosure may be modified into various shapes without departing from the concept of the present disclosure.

FIG. 7 is a cross-sectional view illustrating the detector 10 according to another embodiment of the present disclosure.

Referring to FIG. 7, the light condenser 71 of the reflector 70 may have a cross-section in a form of a portion of a circle. In the present embodiment, the cross-section of the light condenser 71 is shown as the portion of the circle, but is not limited thereto. Further, a shape of the light condenser 71 of the reflector 70 may vary within a form in which the light from the light source unit 20 may be reflected and then travel to the second sensor unit 40. For example, the shape of the light condenser 71 on the cross-section may be a portion of an ellipse or a portion of a parabola. When the shape of the light condenser 71 is the portion of the ellipse or the portion of the parabola, the reaction zone 13 may be disposed on or near a focal point of the ellipse or the parabola.

According to an embodiment of the present disclosure, the light source unit 20 and the sensor units of the detector 10 may be arranged in various forms at various locations.

FIGS. 8 and 9 are cross-sectional views illustrating the detector 10 according to another embodiment of the present disclosure.

Referring to FIGS. 8 and 9, the light source unit includes two light sources, that is, a first light source 20*a* and a second light source 20*b*, and the first sensor unit includes two sensors, that is, a first sensor 30*a* and a second sensor 30*b*. As described above, the number of light sources of the light source unit and the number of sensors of each of the first sensor unit and the second sensor unit are shown as one example, which may different in other embodiments.

According to the present embodiment, the first light source 20*a* and the first sensor 30*a* are arranged adjacent to each other, and the second light source 20*b* and the second sensor 30*b* are also arranged adjacent to each other. Light emitted from the first light source 20*a* is reflected a plurality of times by the reflector 70 and then travels toward the first sensor 30*a*. Thus, such traveling path of the light shows a form in which the light is actually emitted from the first light source 20*a* and returned to the first light source 20*a* (exactly, the first sensor 30*a* near the first light source 20*a*), that is, a retro-reflection form. In the same manner, light emitted from the second light source 20*b* is reflected by the reflector 70 multiple times and then travels toward the second sensor 30*b*. Thus, such traveling path of the light shows a form in which the light is actually emitted from the second light source 20*b* and returned to the second light source 20*b* (exactly, the second sensor 30*b* near the second light source 20*b*), that is, a retro-reflection form. When having such a structure, the arrangement of the light source unit and the sensor unit is simple, and accordingly, there is an advantage in that the detector 10 may be manufactured compactly.

The path of the light from the first light source 20*a* to the first sensor 30*a* and the path of the light from the second light source 20*b* to the second sensor 30*b* may be controlled by appropriately setting a shape of the reflector 70 (especially the angle between the two extensions 73). For example, in FIG. 8, the angle between the two extensions 73 may be about 90 degrees, and in FIG. 9, the angle between the two extensions 73 may be about 80 degrees.

In an embodiment of the present disclosure, the detector may have various configurations. FIG. 10 is a block diagram schematically illustrating a configuration of a detector in order to describe a method for driving a detector according to an embodiment of the present disclosure.

A detector according to an embodiment of the present disclosure may include a light source unit 120, a sensor unit, a controller 110, and a display 160.

The light source unit 120 emits light. The light source unit 120 may include a single light source or a plurality of light sources. When the plurality of light sources are provided, the light sources may emit light of different wavelengths.

The sensor unit may include a plurality of sensor units for sensing the light emitted from the light source unit 120. For example, the sensor unit may include first to third sensor units 130, 140, and 150. Each of the sensor units may include a single or a plurality of sensors. When the plurality of sensors are provided, the sensors may sense light of different wavelengths.

The controller 110 may be electrically connected to the light source unit 120 and the sensor unit, and may include an information acquisition unit 111, a calculation unit 113, and a power supply unit 115.

The information acquisition unit 111 is electrically connected to the first to third sensor units 130, 140, and 150, and receives signals sensed by the first sensor unit 130 to the third sensor unit 150 to acquire information of the particle in the sample.

The calculation unit 113 receives the information associated with the particle from the information acquisition unit 111 to calculate the information, and provides calculated target information to the display 160. The calculation unit 113 may include a circuit (e.g., a signal amplification circuit) for processing the signals from the sensor unit.

The calculation unit 113 calculates an attenuation rate of the light by the scattering, the absorption, the fluorescence, and the reflection in particularly through comparing an amount of light detected from the first to second sensor units 130, 140, and 150 with an amount of the light emitted from the light source unit 120, thereby quantitatively and/or qualitatively analyzing the particle to be detected. In addition, the calculation unit 113 calculates information about an amount of the light of the light source unit 120 received from the third sensor unit 150, and then control the amount of the light of the light source unit 120 through the power supply unit 115.

In an embodiment of the present disclosure, the calculation unit 113 may write a look-up table in advance to quantitatively analyze the particles to be detected, and may calculate the size, the density, the amount, and the like of particles based on information in the lookup table.

The power supply unit 115 supplies power to the light source unit 120, and adjusts the amount of the light by supplying current to the light source unit 120 in a manner of increasing or decreasing an amount of the current based on a signal from the calculation unit 113.

Although not shown in detail, signals between the light source unit 120, the sensor unit, and the controller 110 undergo a process of quantifying the size, the type, the amount, and the density of the particles through comparison with each other.

The display 160 displays the information associated with the particle, for example, the size, the type, the amount, the density, and the like of the particle from the controller 110 in a form that may be visually recognized by a user.

An example of detecting the particles using the detector having the above-described configuration will be described below.

First, the power is supplied to the light source unit 120 through the power supply unit 115. The light source unit 120 may include first to third light sources, and the first to third light sources may emit the ultraviolet light, the visible light, and the infrared light, respectively.

The first sensor unit 30 senses the amount of the light of the light source unit 120 and transmits the information about the amount of the light to the controller 110. The controller 110 receives a value associated with the amount of the light and sets a reference value.

After setting the reference value, the light is emitted from the light source unit 120 and amounts of the scattering, the reflection, the absorption, the fluorescence in the reaction zone are measured through the first to second sensor units 130 and 140. At this time, the amount of the light from the light source unit 120 is sensed by the third sensor unit 150, and whether the light source operates properly is verified by the controller 110 by comparing the amount of the light from the light source unit 120 with the reference value. When the light amount of the light source is different from the reference value, the calculation unit 113 adjusts the amount of the light by increasing or decreasing a current value of the light source unit 120 through the power supply unit 115.

The information of the amounts of the scattering, the reflection, the absorption, the fluorescence, and the like obtained from the first and second sensor units 130 and 140 may be quantified as the size, the type, the amount, the density, and the like through comparison with standard value information, such as the pre-written lookup table. The quantified size, type, amount, density values may be presented to the user via the display.

In the detector according to an embodiment of the present disclosure, the light source unit, the reflector, the sample supply, the first sensor unit, and the second sensor unit described above may constitute one detection module, and a plurality of detection modules may be provided.

FIGS. 11 and 12 are conceptual diagrams illustrating a detector according to one embodiment of the present disclosure.

Referring to FIGS. 11 and 12, a detector 100 according to an embodiment of the present disclosure may be composed of a plurality of detection modules. For example, FIG. 11 illustrates the detector 100 composed of three detection modules, that is, first to third detection modules 10P, 10Q, and 10R. Further, FIG. 12 illustrates the detector 100 composed of four detection modules, that is, first to fourth detection modules 10P, 10Q, 10R, and 10S. In FIGS. 11 and 12, each detection module means a detector of one of the above-described embodiments, but it is simply illustrated for convenience of description.

In the present embodiment, light emitted from light source units of respective detection modules may respectively have wavelengths at least partially different from each other. Further, wavelength bands respectively sensed by the detection modules may also be different from each other. For example, the first detection module 10P may include sensors for detecting the light in the ultraviolet light wavelength band, the second detection module 10Q may include sensors for detecting the light in the visible light wavelength band, and the third detection module 10R may include sensors for detecting the light of the infrared light wavelength band.

In this case, light of various wavelength bands may be measured simultaneously by the plurality of detection modules, thereby significantly increasing detection speed and efficiency.

Hereinabove, although the present disclosure has been described with reference to preferred embodiments, the present disclosure is not limited thereto, but may be variously modified and altered by those skilled in the art to which the present disclosure pertains without departing from the spirit and scope of the present disclosure claimed in the following claims.

Therefore, the scope of the present disclosure should not be limited to the contents described in the detailed description of the specification, but should be construed on the basis of the accompanying claims.

The invention claimed is:

1. A detector comprising:
a light source unit for emitting light;
a reflector for reflecting the light emitted from the light source unit and including:
   a pair of extensions respectively extending in different directions, wherein an angle formed by the pair of extensions is set based on a traveling path of the light;
a first sensor unit for sensing the light reflected by the reflector;
a second sensor unit for sensing scattered light, fluorescence, or both from the sample;
a sensing space housing the light source unit, the first sensor unit, the second sensor unit, and the reflector such that a portion of the light emitted from the light source unit has a path of being reflected by one of the extensions, then being reflected by the other of the extensions, and then traveling toward the first sensor unit; and
wherein the sensing space further comprises a reaction zone including the sample and where a reaction between the light from the light source unit and the sample takes place, and the reaction zone is positioned such that the light reflected by the reflector travels toward the reaction zone;
wherein the second sensor unit is provided at a location opposite to the reflector with the reaction zone interposed therebetween; and
the first sensor unit is disposed on a first path and the second sensor unit is disposed on a second path different from the first path, the light emitted from the light source unit not meeting the sample on the first path.

2. The detector of claim 1, wherein the light source unit emits at least one wavelength band of infrared light, visible light, and ultraviolet light.

3. The detector of claim 2, wherein the light source unit emits a wavelength band of 210 to 1200 nm.

4. The detector of claim 1, wherein the light source unit includes at least one light source.

5. The detector of claim 4, wherein the light source unit includes a plurality of light sources emitting light of different wavelengths.

6. The detector of claim 1, wherein the first sensor unit, the second sensor unit, or both include at least one sensor corresponding to the light source unit.

7. The detector of claim 6, wherein the light source unit emits light of a wavelength corresponding to a size of a target to be sensed, and
wherein the first sensor unit, the second sensor unit, or both sense the light of the wavelength corresponding to the size of the target.

8. The detector of claim 6, wherein the first sensor unit includes a first infrared light sensor, a first visible light sensor, a first ultraviolet light sensor, or a combination thereof.

9. The detector of claim 6, wherein the second sensor unit includes a second infrared light sensor, a second visible light sensor, a second ultraviolet light sensor, or a combination thereof.

10. The detector of claim 1, further comprising:
a third sensor unit disposed adjacent to the light source unit and sensing an amount of the light emitted from the light source unit.

11. The detector of claim 10, wherein the third sensor unit includes a third infrared light sensor, a third visible light sensor, a third ultraviolet light sensor, or a combination thereof.

12. The detector of claim 1,
wherein the pair of extensions respectively extend from both ends of a light condenser and formed in a plate shape,
wherein the angle between the two extensions is 80 degree to 110 degree.

13. The detector of claim 1, further comprising:
an optical lens unit disposed between the reflector and the second sensor unit.

14. The detector of claim 1, further comprising:
a polarizing filter disposed on the path of the light and polarizing the light.

15. The detector of claim 1, further comprising:
a heater that provides heat to the sensing space.

16. The detector of claim 1, wherein the light source unit, the reflector, the first sensor unit, and the second sensor unit constitute a detection module, and
wherein the detector includes a plurality of detection modules.

17. The detector of claim 16, wherein light emitted from light source units of the respective detection modules have wavelengths at least partially different from each other.

18. The detector of claim 1, wherein the light source unit includes a light emitting diode.

19. The detector of claim 1, wherein the sample is provided in fluid.

20. A detector comprising:
one or more light source units that emit light toward a sample;
a sensor unit including a plurality of sensor units for sensing the light emitted from one or more light source units;
a reflector for reflecting the light emitted from the light source units and including:
a pair of extensions respectively extending in different directions, wherein an angle formed by the pair of extensions is set based on a traveling path of the light;
wherein the sensor unit further includes:
a first sensor unit for sensing the light reflected by the reflector;
a second sensor unit for sensing scattered light, fluorescence, or both from the sample;
a sensing space housing the light source units, the first sensor unit, the second sensor unit, and the reflector such that a portion of the light emitted from the light source unit has a path of being reflected by one of the extensions, then being reflected by the other of the extensions, and then traveling toward the first sensor unit;
wherein the sensing space further comprises a reaction zone including the sample and where a reaction between the light from the light source units and the sample takes place, and the reaction zone is positioned such that the light reflected by the reflector travels toward the reaction zone;
wherein the second sensor unit is provided at a location opposite to the reflector with the reaction zone interposed therebetween; and
the first sensor unit is disposed on a first path and the second sensor unit is disposed on a second path different from the first path, the light emitted from the light source unit not meeting the sample on the first path;
a controller electrically connected to the light source units and the sensor unit, the controller comprising an information acquisition unit that acquires target information in the sample using values sensed by the first sensor unit and the second sensor unit; and
a display that displays the target information to a user.

21. The detector of claim 20, further comprising:
a calculation unit for receiving the target information from the information acquisition unit, calculating the target information, and providing calculated target information to the display.

22. The detector of claim 20, wherein the detector senses dust, a germ, a mold, a virus, or a combination thereof present in the sample.

* * * * *